US008255110B2

(12) United States Patent
Taguchi

(10) Patent No.: US 8,255,110 B2
(45) Date of Patent: Aug. 28, 2012

(54) TRAVEL TRACE GENERATION METHOD AND TRAVEL TRACE GENERATION DEVICE

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 350 days.

(21) Appl. No.: 12/740,058

(22) PCT Filed: Oct. 29, 2008

(86) PCT No.: PCT/JP2008/069665
§ 371 (c)(1),
(2), (4) Date: Apr. 27, 2010

(87) PCT Pub. No.: WO2009/057649
PCT Pub. Date: May 7, 2009

(65) Prior Publication Data
US 2010/0256856 A1    Oct. 7, 2010

(30) Foreign Application Priority Data

Nov. 1, 2007   (JP) ................................. 2007-285451

(51) Int. Cl.
G01M 17/00    (2006.01)
G06F 7/00    (2006.01)
G06F 11/30    (2006.01)
(52) U.S. Cl. ...................... 701/29.1; 701/29.3; 701/30.2; 701/30.3; 701/30.5; 701/30.7
(58) Field of Classification Search ................. 701/29.1, 701/29.3, 30.2, 30.3, 30.5, 30.7
See application file for complete search history.

(56) References Cited

U.S. PATENT DOCUMENTS 5,504,682 A * 4/1996 Shiraishi et al. .............. 701/111
6,122,577 A * 9/2000 Mergenthaler et al. ...... 701/30.2
6,609,051 B2 * 8/2003 Fiechter et al. .............. 701/29.3
(Continued)

FOREIGN PATENT DOCUMENTS
DE    10 2004 048 494 A1    6/2005
(Continued)

OTHER PUBLICATIONS

Fujioka, T. et al., "Numerical Analysis of Minimum-Time Cornering—The Fourth Report: Road Constraints Using Inequality Constraints on State Values," *Society of Automotive Engineers of Japan, collection of papers*, Jul. 1993, pp. 106-111, vol. 24, No. 3 (with Abstract).

(Continued)

Primary Examiner — Toan To
(74) Attorney, Agent, or Firm — Oliff & Berridge, PLC

(57) ABSTRACT

It is an object of the present invention to provide a travel locus generating method and a travel locus generating device for generating a travel locus in consideration of a fuel consumption characteristic. The present invention is a travel locus generating device that generates a future travel locus of a vehicle and is characterized by including a restriction condition calculating means for performing a convergence calculation of restriction conditions including at least a condition of a road boundary and an evaluation function calculating means for deriving a travel locus by a convergence calculation using an evaluation function, which includes at least evaluation of a variance of speed, in a state where the restriction conditions of the restriction condition calculating means are satisfied.

8 Claims, 7 Drawing Sheets

U.S. PATENT DOCUMENTS

| | | | |
|---|---|---|---|
| 6,912,452 B2 * | 6/2005 | Sakamoto et al. | 701/1 |
| 7,103,460 B1 * | 9/2006 | Breed | 701/32.9 |
| 7,899,592 B2 * | 3/2011 | Yaqub | 701/29.3 |
| 8,170,725 B2 * | 5/2012 | Chin et al. | 701/1 |
| 8,180,518 B2 * | 5/2012 | Petricoin, Jr. | 701/30.6 |
| 2002/0049523 A1 * | 4/2002 | Diaz et al. | 701/33 |
| 2004/0073339 A1 * | 4/2004 | Ruoppolo | 701/1 |

FOREIGN PATENT DOCUMENTS

| | | |
|---|---|---|
| DE | 10 2005 049 458 A1 | 4/2007 |
| JP | A-7-192194 | 7/1995 |
| JP | A-11-208306 | 8/1999 |
| JP | A-2000-346594 | 12/2000 |
| JP | A-2003-70102 | 3/2003 |
| JP | A-2003-99897 | 4/2003 |
| JP | A-2004-251786 | 9/2004 |
| JP | A-2004-326363 | 11/2004 |
| JP | A-2005-182186 | 7/2005 |
| JP | A-2005-228139 | 8/2005 |
| JP | A-2006-347214 | 12/2006 |
| JP | A-2008-195226 | 8/2008 |

OTHER PUBLICATIONS

International Search Report issued in International Application No. PCT/JP2008/069665 on Feb. 10, 2009.

Japanese Office Action issued in Japanese Patent Application No. 2007-285451 on Feb. 3, 2009 (with translation).

Japanese Office Action issued in Japanese Patent Application No. 2007-285451 on May 12, 2009 (with translation).

International Preliminary Report on Patentability issued in International Application No. PCT/JP2008/069665 on Jun. 1, 2010 (with translation).

* cited by examiner

TRAVEL TRACE GENERATION METHOD AND TRAVEL TRACE GENERATION DEVICE

TECHNICAL FIELD

The present invention relates to a travel locus generating method and a travel locus generating device for generating a future travel locus of a vehicle.

BACKGROUND ART

Techniques of generating the optimal travel locus of a vehicle and offering various kinds of driving support or performing automatic driving using the travel locus have been developed. Patent Citation 1 discloses a device that detects the road shape in front of a vehicle, calculates the future position of the vehicle on the basis of the road shape and the travel speed of the vehicle, and projects and displays the future position of the vehicle on a windshield. Particularly in the case of a curved road, a clipping point, which is a characteristic point of curved roads, and the future position of the vehicle are projected and displayed together on the windshield. In addition, a method of generating an optimal travel locus for traveling at the maximum speed on a curved road is disclosed in Non-patent Citation 1.

CITATION LIST

Patent Citation 1 Japanese Unexamined Patent Publication No. 2005-228139
Patent Citation 2 Japanese Unexamined Patent Publication No. 2006-347214
Non-Patent Citation 1 "Theoretical study on the shortest-time cornering method", by Fujioka Takehiko, Emori Hiromasa, Society of Automotive Engineers of Japan, collection of papers Vol. 24, No. 3, pp. 106-111, July 1993

SUMMARY OF INVENTION

Technical Problem

The known method of generating a travel locus is a method of generating a travel locus using evaluation conditions such as maximum-speed traveling, and a fuel consumption characteristic is not taken into consideration. For this reason, it is easy to reach the maximum amount of accelerator operation or brake operation, and the travel locus is not good in terms of gas mileage. In particular, since acceleration or deceleration is needed according to the occurrence of a lateral force in the case of a curved road, a travel locus with poor fuel efficiency is the result if the fuel consumption characteristic is not considered.

Therefore, it is an object of the present invention to provide a travel locus generating method and a travel locus generating device for generating a travel locus in consideration of a fuel consumption characteristic.

Technical Solution

A travel locus generating method according to the present invention is a travel locus generating method of generating a future travel locus of a vehicle, and is characterized by including a restriction condition calculating step of performing a convergence calculation of restriction conditions including at least a condition of a road boundary and an evaluation function calculating step of deriving a travel locus by a convergence calculation using an evaluation function, which includes at least evaluation of a variance of speed, in a state where the restriction conditions in the restriction condition calculating step are satisfied.

In this travel locus generating method, a convergence calculation is first performed on the basis of the restriction conditions including at least a condition of a road boundary, and then the convergence calculation is performed by an evaluation function including at least an evaluation condition of the variance of speed while maintaining the restriction conditions and a travel locus of optimal evaluation is derived. In order to improve the gas mileage, it is important to suppress the air resistance along the entire travel path. Since the air resistance increases as the square of the speed, the air resistance increases as the travel speed of a vehicle increases. As a result, the gas mileage is reduced. Therefore, a function including the variance of speed of a vehicle is set as the evaluation function of optimization. Since acceleration and deceleration are suppressed as much as possible through the entire travel path by optimizing a travel locus using the evaluation function, a travel locus with little variation in the vehicle speed can be derived. As a result, an increase in the air resistance caused by an increase in the maximum speed can be suppressed. Thus, in this travel locus generating method, it is possible to generate a travel locus in consideration of a fuel consumption characteristic by including the variance of speed in the evaluation function. This can contribute to an improvement in gas mileage. Particularly for a curved road where a lateral force occurs and acceleration and deceleration are needed, it is possible to generate a suitable travel locus in consideration of a fuel consumption characteristic.

The travel locus generating method of the present invention may further include an initial condition generating step of generating a travel locus, in which decelerating by regenerative deceleration at the time of deceleration of a vehicle is prioritized, as an initial condition when the driving system of the vehicle is a hybrid system.

In this travel locus generating method, in the case of a hybrid vehicle, a travel locus, in which decelerating by regenerative deceleration at the time of deceleration is prioritized, is generated as an initial condition, and a restriction condition convergence calculation and an evaluation function convergence calculation are performed using the travel locus as an initial condition. By decelerating in a state where priority is given to regenerative deceleration (that is, decelerating only by regenerative braking by prioritizing deceleration by regenerative braking), energy loss caused by heat radiation at the time of operation of a hydraulic brake can be reduced. This can contribute to an improvement in gas mileage. Thus, since a travel locus which approximates the optimal locus can be used from the beginning of optimization processing by performing the optimization using the travel locus, in which the fuel consumption characteristic is taken into consideration, as the initial condition, erroneous travel loci resulting from use of a local minimum value can be avoided. Accordingly, since the optimal locus is approached quickly, the processing load can also be reduced. Thus, in this travel locus generating method, a travel locus excellent in the fuel consumption characteristic can be reliably derived with a low processing load by generating beforehand the initial condition which prioritizes regenerative deceleration in a hybrid system. In addition, when an optimization technique is used for a vehicle, an erroneous solution resulting from a local minimum solution may be derived in the optimization technique due to hysteresis (for example, hysteresis between "from second gear speed to third gear speed" and "from third gear speed to second gear speed") caused by a transmission or the like.

In the initial condition generating step of the travel locus generating method of the present invention, a travel locus may be generated in which a clipping point is moved to a curve entrance side and a minimum speed point is moved to a curve exit side corresponding to a deceleration upper limit and an acceleration upper limit determined by system capability of the hybrid system.

In the case of decelerating only by regeneration, there is a margin corresponding to deceleration of a hydraulic brake at the time of deceleration (there is a margin in the front and back force), compared with a case where deceleration is performed with the total deceleration capability (deceleration using a regenerative brake+deceleration using a hydraulic brake) of the vehicle. Therefore, when considering friction circle limitation by the lateral force and the front and back force, the margin is distributed to the lateral force at the time of deceleration on a curved road. As a result, the traveling curve can be made long by the margin at the time of deceleration, and it approaches a straight line at the time of acceleration since there is no margin. In order to follow such a travel locus on a curved road, it is necessary to move the clipping point to the curve entrance side and to move the minimum speed point to the curve exit side. Therefore, in the initial condition generating step, the deceleration upper limit and the acceleration deceleration value are determined in consideration of the system capability of a hybrid system, and the travel locus is generated by moving the clipping point to the curve entrance side and moving the minimum speed point to the curve exit side corresponding to the deceleration upper limit and the acceleration upper limit.

The travel locus generating method of the present invention may further include: a block dividing step of dividing a continuous curve into a plurality of blocks; a maximum-speed traveling optimizing step of performing optimization processing under a maximum-speed traveling condition; a transit time calculating step of calculating a transit time of each block divided in the block dividing step on the basis of an optimization result in the maximum-speed traveling optimizing step; a marginal time calculating step of calculating a marginal time of each block on the basis of the amount of brake heat radiation in each block divided in the block dividing step; and a target transit time calculating step of calculating a target transit time of each block on the basis of the transit time of each block calculated in the transit time calculating step and the marginal time of each block calculated in the marginal time calculating step.

In this travel locus generating method, in the case of a continuous curve, the continuous curve is divided into a plurality of blocks. In addition, in the travel locus generating method, optimization processing under the maximum-speed traveling condition is performed for the entire continuous curve and the transit time of each block at the time of maximum-speed traveling is calculated from the optimization result under the maximum-speed traveling condition. Moreover, in the travel locus generating method, a marginal time proportional to the amount of brake heat radiation in each block is calculated. Moreover, in the travel locus generating method, a target transit time of each block is calculated on the basis of the transit time and the marginal time in the maximum-speed traveling of each block. Thus, since a continuous curve (winding road or the like) is divided into respective blocks and the marginal time (the time by which it is allowed to be later than in maximum-speed traveling) is distributed to each block in proportion to the amount of brake heat radiation (useless energy and the cause of high fuel consumption) in each block, the optimization can be performed for every block by division into a block in which gas mileage is prioritized and a block in which a transit time is prioritized. Thus, in this travel locus generating method, optimization processing can be individually performed for each block using the target transit time of each block as a restriction condition. As a result, memory or the processing load can be reduced. In addition, if the optimization processing is simultaneously performed for the plurality of blocks, a large memory and a complicated program are needed. Accordingly, the processing load also increases.

A travel locus generating device according to the present invention is a travel locus generating device that generates a future travel locus of a vehicle and is characterized by including a restriction condition calculating means for performing a convergence calculation of restriction conditions including at least a condition of a road boundary and an evaluation function calculating means for deriving a travel locus by a convergence calculation using an evaluation function, which includes at least evaluation of a variance of speed, in a state where the restriction conditions of the restriction condition calculating means are satisfied.

The travel locus generating device of the present invention may further include an initial condition generating means for generating a travel locus, in which decelerating by regenerative deceleration at the time of deceleration of a vehicle is prioritized, as an initial condition when the driving system of the vehicle is a hybrid system.

In the initial condition generating means of the travel locus generating device of the present invention, a travel locus may be generated in which a clipping point is moved to a curve entrance side and a minimum speed point is moved to a curve exit side corresponding to a deceleration upper limit and an acceleration upper limit determined by system capability of the hybrid system.

The travel locus generating device of the present invention may further include: a block dividing means for dividing a continuous curve into a plurality of blocks; a maximum-speed traveling optimizing means for performing optimization processing under a maximum-speed traveling condition; a transit time calculating means for calculating a transit time of each block divided by the block dividing means on the basis of an optimization result of the maximum-speed traveling optimizing means; a marginal time calculating means for calculating a marginal time of each block on the basis of the amount of brake heat radiation in each block divided by the block dividing means; and a target transit time calculating means for calculating a target transit time of each block on the basis of the transit time of each block calculated by the transit time calculating means and the marginal time of each block calculated by the marginal time calculating means.

Each travel locus generating device has the same operations and effects as in each travel locus generating method described above.

Advantageous Effects

In the present invention, it is possible to generate a travel locus in consideration of a fuel consumption characteristic by performing optimization using an evaluation function including the variance of speed. This can contribute to an improvement in gas mileage.

EXPLANATION OF REFERENCE

Figure 1:
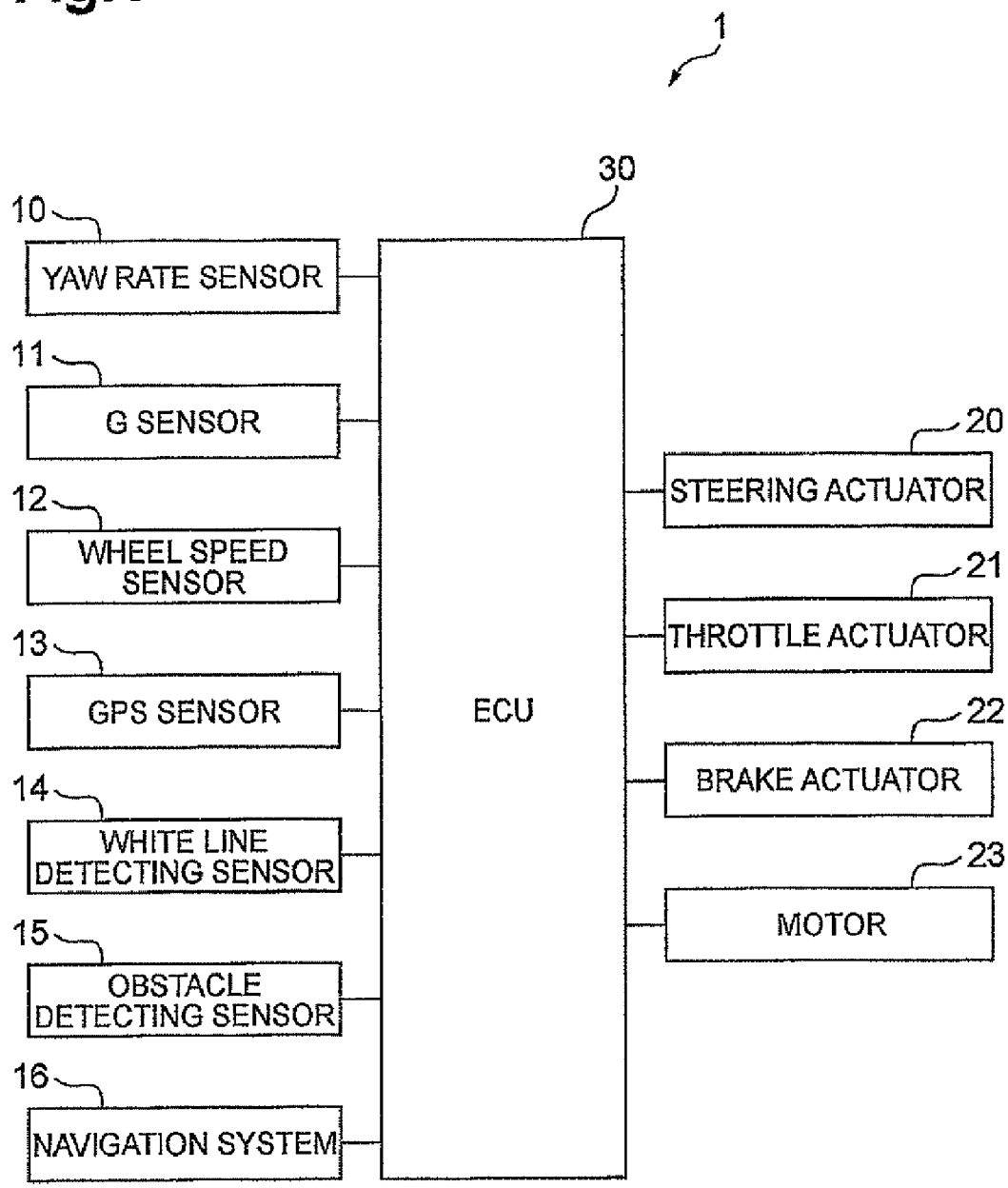
FIG. 1 is a block diagram of an automatic driving controller according to the present embodiment.

1: automatic driving controller
10: yaw rate sensor
11: G sensor
12: wheel speed sensor
13: GPS sensor
14: white line detecting sensor
15: obstacle detecting sensor
16: navigation system
20: steering actuator
21: throttle actuator
22: brake actuator
23: motor
30: ECU

DESCRIPTION OF EMBODIMENTS

Hereinafter, embodiments of a travel locus generating method and a travel locus generating device according to the present invention will be described with reference to the drawings.

In the present embodiment, the present invention is applied to an automatic driving controller mounted in a hybrid vehicle which performs automatic driving. The automatic driving controller according to the present embodiment generates a travel locus by optimization processing and performs acceleration or deceleration control and steering control so that the vehicle travels along the optimal travel locus.

Figure 2:
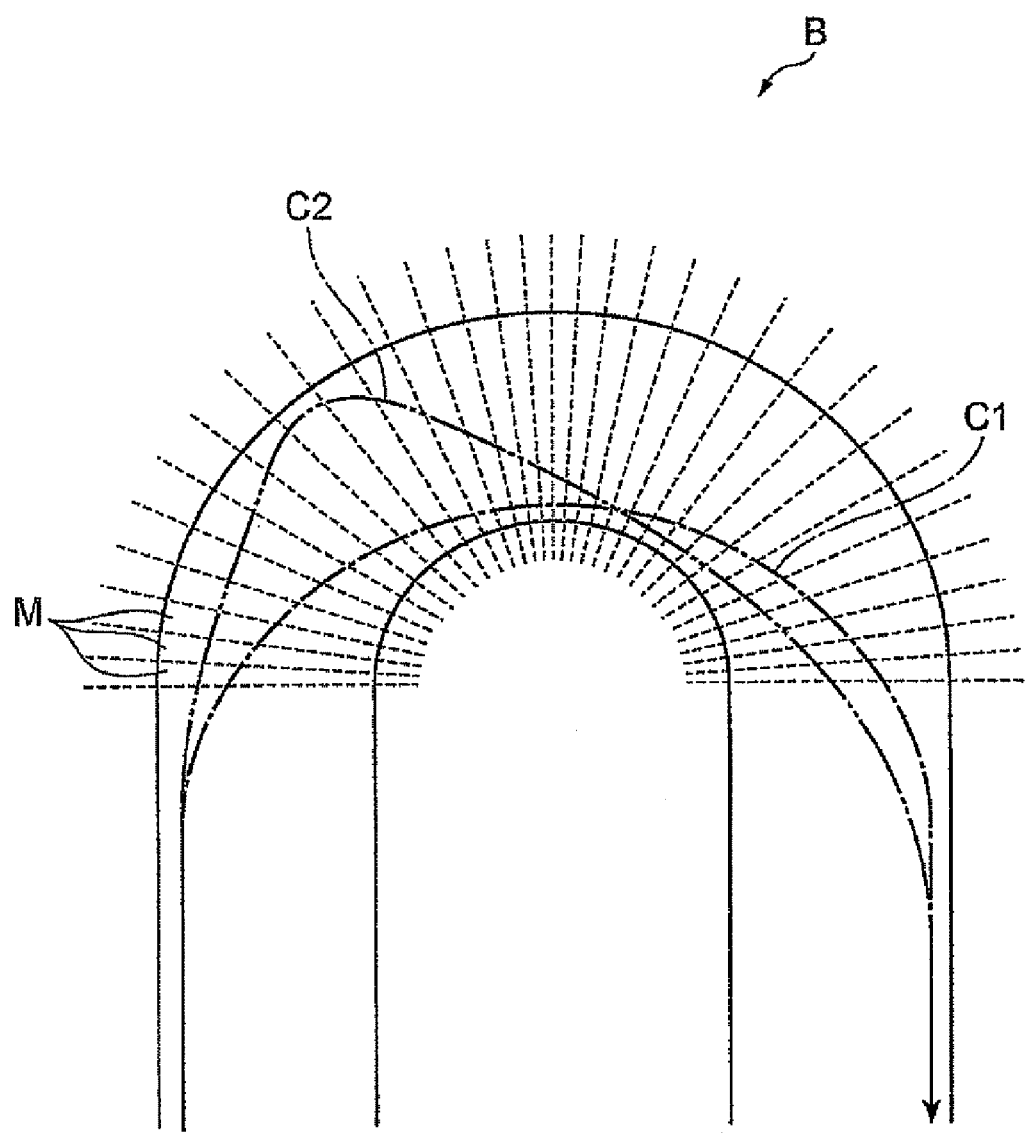
FIG. 2 is an explanatory view of a travel locus optimizing function in the automatic driving controller according to the present embodiment.

The generated travel locus is configured to include a number of parameters required for the traveling of a vehicle, such as a position (x coordinate, y coordinate), a vehicle speed pattern ($v_x$, $v_y$), an acceleration pattern ($a_x$, $a_y$), a yaw angle, and a yaw rate. In the automatic driving controller according to the present embodiment, as shown in FIG. 2, one curved road or the like is treated in units of a block B, and a travel locus in each block B is generated in units of mesh M, . . . obtained by finely dividing a travel path along the travel direction. Accordingly, the travel locus in one block B is configured to include data of (number of meshes M, . . . ×number of parameters). For example, when the number of parameters is 10 and the number of meshes is 100, the travel locus of one block B is configured to include 1000 pieces of data.

Generally, if a travel condition which prioritizes only gas mileage is set, it is known that excessively low-speed traveling is ideal fuel consumption traveling. If optimization processing is performed under a travel condition which prioritizes only gas mileage, a travel locus with a vehicle speed pattern that cannot be practically used is generated. Therefore, in the automatic driving controller according to the present embodiment, in order to suppress this, not only a gas mileage improvement condition but also a travel time condition is added to the evaluation function of optimization processing.

Moreover, in a situation where there is sufficient room in the tire friction in the left and right direction of a straight road, a highway, or the like, an optimal travel locus could also be generated by known optimization techniques. However, in the case of a curved road, sufficient deceleration from the vehicle speed at which the vehicle can travel on the straight road before and after the curve is needed. Accordingly, since curve traveling involves deceleration, cornering, and acceleration, acceleration and deceleration in the front and back direction and the lateral force in the left and right direction occur. Therefore, the automatic driving controller according to the present embodiment generates, a travel locus which is especially optimal on a curved road. In addition, although a method of generating a travel locus suitable for a curved road is illustrated in the present embodiment, it is also suitable for the straight road. In addition, the known generation methods may also be used for the straight road.

In addition, when performing the optimization processing, an erroneous solution resulting from a local minimum solution may be derived due to hysteresis (for example, hysteresis between "from second gear speed to third gear speed" and "from third gear speed to second gear speed") caused by a transmission or the like. Therefore, the automatic driving controller according to the present embodiment generates a travel locus, which approximates the optimal travel locus, as an initial condition as pretreatment for performing the optimization processing.

Figure 3:
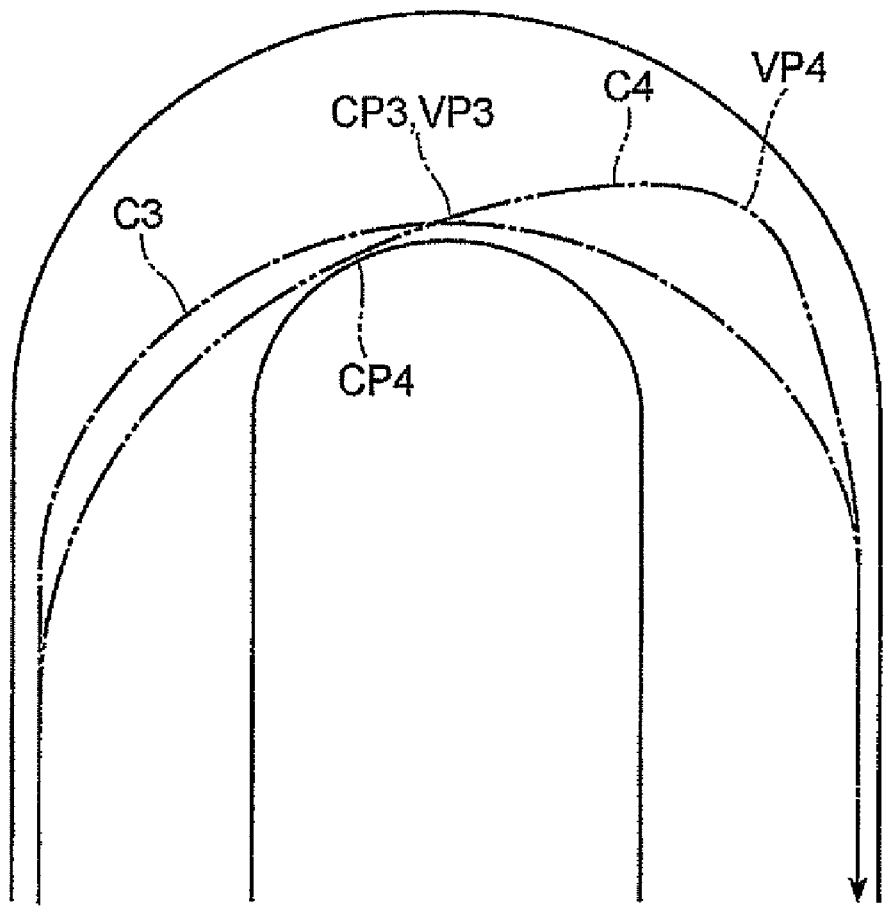
FIG. 3 is an explanatory view of an initial condition generating function in the automatic driving controller according to the present embodiment.
Figure 4:
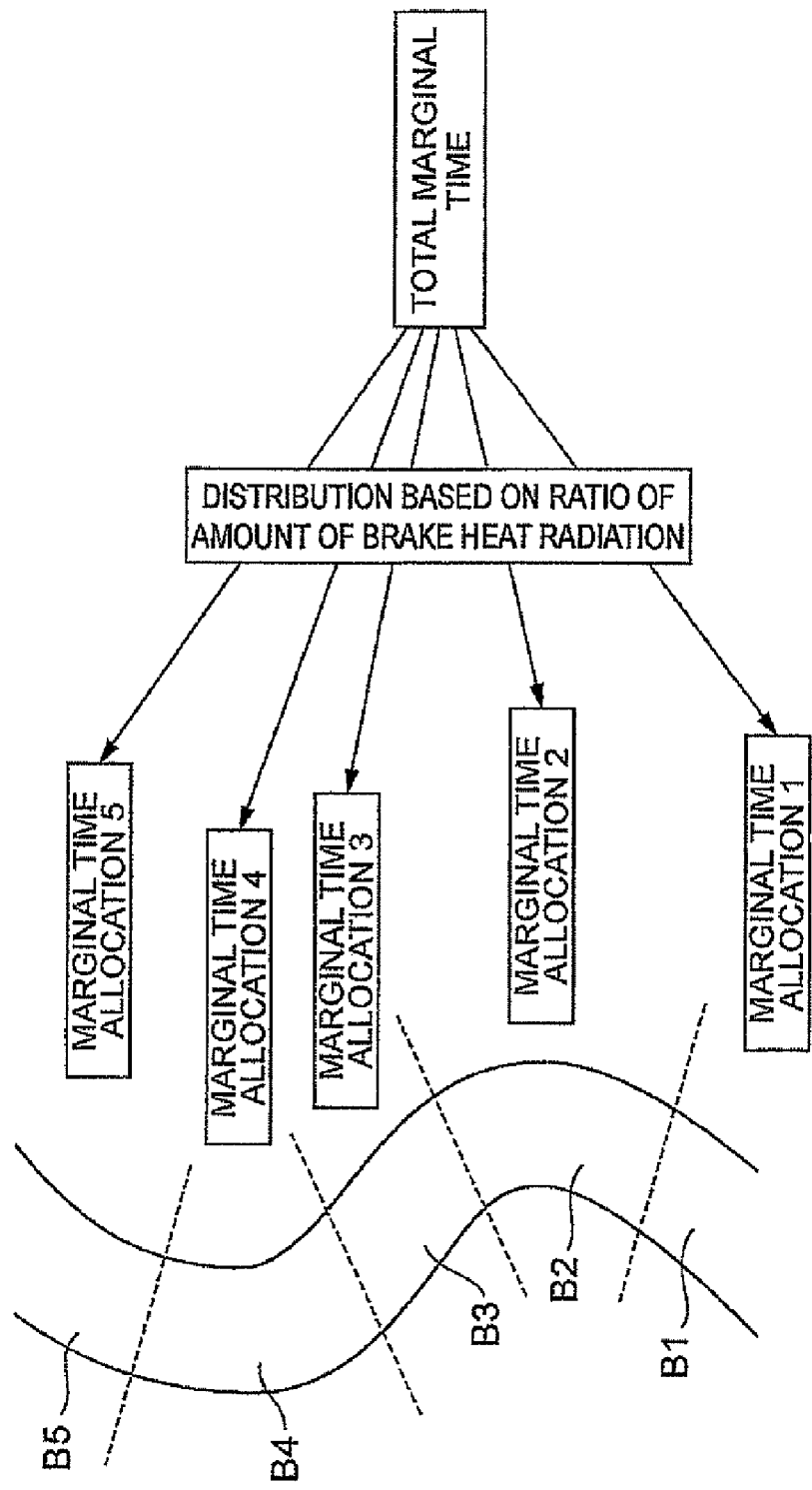
FIG. 4 is an explanatory view of a continuous curve managing function in the automatic driving controller according to the present embodiment.

Referring to FIGS. 1 to 4, an automatic driving controller 1 according to the present embodiment will be described. FIG. 1 is a block diagram of the automatic driving controller according to the present embodiment. FIG. 2 is an explanatory view of a travel locus optimizing function in the automatic driving controller according to the present embodiment. FIG. 3 is an explanatory view of an initial condition generating function in the automatic driving controller according to the present embodiment. FIG. 4 is an explanatory view of a continuous curve managing function in the automatic driving controller according to the present embodiment.

The automatic driving controller 1 generates an optimal locus (especially, a curved road) in which a practical travel time and a reduction of fuel consumption are compatible. The automatic driving controller 1 has the travel locus optimizing function, the initial condition generating function, and the continuous curve managing function in order to generate the optimal locus and also has a vehicle control function for vehicle control in automatic driving.

The automatic driving controller 1 includes a yaw rate sensor 10, a G sensor 11, a wheel speed sensor 12, a GPS [Global Positioning System] sensor 13, a white line detecting sensor 14, an obstacle detecting sensor 15, a steering actuator 20, a throttle actuator 21, a brake actuator 22, a motor 23, and an ECU [Electronic Control Unit] 30 and uses information from a navigation system 16.

The yaw rate sensor 10 is a sensor which detects the yaw rate generated in the vehicle. The yaw rate sensor 10 detects a yaw rate and transmits the yaw rate to the ECU 30 as a yaw rate signal.

The G sensor 11 is a sensor which detects the lateral acceleration or forward and backward acceleration acting on the vehicle. The G sensor 11 detects the acceleration acting on the vehicle and transmits the acceleration to the ECU 30 as a G signal. In addition, a lateral G sensor and a longitudinal G sensor are configured for every acceleration detected.

The wheel speed sensor 12 is a sensor which is provided in four wheels of the vehicle and detects the rotating speed (the number of pulses corresponding to the rotation of a wheel) of the wheel. The wheel speed sensor 12 detects the number of rotation pulses of a wheel every predetermined time and transmits the detected number of rotation pulses of the wheel to the ECU 30 as a wheel speed signal. The ECU 30 calculates a wheel speed from the rotating speed of each wheel and calculates a vehicle body speed (vehicle speed) from the wheel speed of each wheel.

The GPS sensor 13 includes a UPS antenna or a processor, and is a sensor which estimates the position of a vehicle. In the GPS sensor 13, the GPS antenna receives a GPS signal from a GPS satellite. Moreover, in the UPS sensor 13, the processor demodulates the GPS signal and calculates the position of the vehicle on the basis of the demodulated position data of each GPS satellite. In addition, the GPS sensor 13 transmits to the ECU 30 a GPS information signal indicating the position of the vehicle. Moreover, in order to calculate the current position, the position data of three or more UPS satellites is needed. Accordingly, the GPS sensor 13 receives GPS signals from three or more different GPS satellites.

The white line detecting sensor 14 includes a camera or an image processor, and is a sensor which detects a pair of white lines (lane). In the white line detecting sensor 14, the camera images the road in front of the vehicle. Moreover, in the white line detecting sensor 14, the image processor recognizes a pair of white lines, which shows the lane along which the vehicle travels, from the imaged image. In addition, the lane width, a line passing through the center of the pair of white lines (that is, a centerline of the lane), the radius (curve radius R) from the center of the lane, the curve curvature $\gamma(=1/R)$ from the curve radius R, the direction (yaw angle) of the vehicle with respect to the white lines, the position (offset) of the vehicle center with respect to the center of the lane, and the like are calculated from the pair of recognized white lines. In addition, the white line detecting sensor 14 transmits the information on the pair of recognized white lines or the calculated information to the ECU 30 as a white line detection signal.

The obstacle detecting sensor 15 includes a millimeter wave radar or a processor, and is a sensor which detects an obstacle (vehicle or the like) existing around the vehicle. In the obstacle detecting sensor 15, the millimeter wave radar emits a millimeter wave and receives a millimeter wave which returns due to reflection on an object. In addition, in the obstacle detecting sensor 15, the processor detects whether or not an obstacle is present on the basis of the transmitted and received millimeter wave data, and calculates a distance to the obstacle when the obstacle has been detected. The obstacle detecting sensor 15 transmits the information on the detected obstacle or the calculated information to the ECU 30 as an obstacle detection signal. In addition, any kind of method may be used as the method of detecting an obstacle. For example, there are a method using an image imaged by a camera, a method using an image imaged by a camera and the radar information, such as a millimeter wave, and a method of acquisition using infrastructure communication.

The navigation system 16 is a system which detects the current position of the vehicle and guides the course to the destination. In particular, the navigation system 16 reads the shape information regarding the current driving road from the map database and transmits the road shape information to the ECU 30 as a navigation signal. In addition, in the case of a vehicle which does not include a navigation system, it may be configured to include at least a map database in which at least the road shape information is stored or may be configured to acquire the road shape information using communication between a road and a vehicle or the like.

The steering actuator 20 is an actuator for transmitting the rotational driving force of a motor to a steering mechanism (a rack, a pinion, a column, and the like) through a deceleration mechanism and for giving the steering torque to the steering mechanism. In the steering actuator 20, when a steering control signal is received from the ECU 30, a motor is rotatably driven according to the steering control signal to thereby generate the steering torque.

The throttle actuator 21 is an actuator which adjusts the opening ratio of a throttle valve of an engine which is one of the driving sources. When an engine control signal is received from the ECU 30, the throttle actuator 21 operates according to the engine control signal and adjusts the opening ratio of a throttle valve.

The brake actuator 22 is an actuator which adjusts the brake hydraulic pressure of a wheel cylinder of each wheel. When a brake control signal is received from the ECU 30, the throttle actuator 22 operates according to the brake control signal and adjusts the brake hydraulic pressure of a wheel cylinder.

The motor 23 is an electric motor which is one of the driving sources. In addition, the motor 23 has a function as a generator, and performs regenerative power generation by converting the rotation energy (kinetic energy) of a wheel into electrical energy. When a motor control signal is received, the motor 23 is rotatably driven according to the motor control signal to thereby generate a driving force. In addition, when a regeneration control signal is received, the motor 23 generates electric power according to the regeneration control signal and charges a battery with the generated electric power.

The ECU 30 includes a CPU [Central Processing Unit], a ROM [Read Only Memory], a RAM [Random Access Memory], and the like and is an electronic control unit which performs overall control of the automatic driving controller 1. The ECU 30 receives a signal from each of the sensors 10 to 15 and a signal from the navigation system 16 at predetermined intervals. In addition, the ECU 30 generates an optimal travel locus by performing travel locus optimization processing, initial condition generation processing, continuous curve managing processing, and the like. In addition, the ECU 30 controls the steering actuator 20, the throttle actuator 21, the brake actuator 22, and the motor 23 by performing vehicle control processing on the basis of the generated optimal travel locus.

In addition, in the present embodiment, the travel locus optimization processing in the ECU 30 is equivalent to a restriction condition calculating means and an evaluation function calculating means described in the appended claims, the initial condition generation processing in the ECU 30 is equivalent to an initial condition generating means described in the appended claims, and the continuous curve managing processing in the ECU 30 is equivalent to a block dividing means, a maximum-speed traveling optimizing means, a transit time calculating means, a marginal time calculating means, and a target transit time calculating means described in the appended claims.

The travel locus optimization processing will be described. Any kind of technique may be used as the optimization technique. For example, SCGRA [Sequential Conjugate Gradient Restoration Algorithm] disclosed in Non-patent Citation 1 is used. In the SCGRA, a convergence calculation is performed on the basis of a steepest descent method until restriction conditions are satisfied, and a convergence calculation is performed on the basis of a conjugate gradient method until the evaluation value of an evaluation function becomes the minimum. The restriction conditions are conditions which should be followed absolutely in traveling of a vehicle. The evaluation function is a function for evaluating the conditions prioritized in traveling of a vehicle.

In order to improve the gas mileage, it is important to suppress the air resistance in the entire block B which is a travel path. Since the air resistance increases as the square of the speed, the air resistance increases as the travel speed of a vehicle increases. As a result, the gas mileage is reduced. Therefore, a function including the sum of variance of the vehicle speed in the entire block B is set as the evaluation function. Since acceleration and deceleration are suppressed as much as possible through the entire block B by optimizing a travel locus using the evaluation function, a travel locus with little variation in the vehicle speed can be derived. As a result, an increase in the air resistance caused by an increase in the maximum speed can be suppressed.

However, if a vehicle travels at a fixed low speed (for example, a minimum vehicle speed on a curved road) by prioritizing only gas mileage, the gas mileage is improved, but a vehicle speed pattern which cannot be practically used is obtained. Therefore, a function including a transit time of the block B in addition to the sum of variance of the vehicle speed in the entire block B is set as the evaluation function. Using this evaluation function, the vehicle can travel at the vehicle speed, which does not cause a problem in practice, through the entire block B and a change in the vehicle speed can be suppressed as much as possible through the entire block B. As a result, a travel locus with reduced air resistance can be generated.

The ECU 30 sets an initial locus as an initial condition and performs a convergence calculation on the basis of a steepest descent method until the restriction conditions are satisfied. As the restriction conditions, there are conditions of the road side and conditions of the vehicle side. The conditions of the road side include a road boundary (running on the road), and the conditions of the vehicle side include vehicle performance limitations, such as a circle of friction, acceleration limitation, deceleration limitation, and steering limitation. Specifically, a convergence calculation of a current travel locus is performed on the basis of the restriction conditions using a travel locus (initial locus calculated in the first convergence calculation) calculated for the previous time, it is determined whether or not the restriction conditions are satisfied using the travel locus calculated this time, and the convergence calculation and the determination in each processing loop are repeated until a travel locus which satisfies the restriction conditions is calculated. In each processing loop, a travel locus configured to include the data (number of meshes M, . . . ×number of parameters) in units of block B is calculated.

If a travel locus which satisfies the restriction conditions is derived, the ECU 30 performs a convergence calculation on the basis of a conjugate gradient method until the evaluation value of the evaluation function becomes the minimum while satisfying the restriction conditions. As the evaluation function, as shown in Expression (1), a function obtained by adding the sum of variance of the vehicle speed to the transit time of the block B is set. In the entire block 13, the transit time and the variance of the vehicle speed are made to be reduced. The transit time is a target time for passing the block B. For example, there are a time calculated from the speed limit on the road and a time input by the driver. In addition, although the addition rate of the transit time and the variance of the vehicle speed is set to 0.5 to 0.5, arbitrary values may be set. For example, the addition rate input by the driver is used.

[Expression 1]

$$\text{Evaluation value} = \sum_{i=1}^{number\ of\ meshes} (0.5 \times \text{transit time} + 0.5 \times (\text{vehicle speed in each mesh} - \text{average vehicle speed})^2) \quad (1)$$

Specifically, a convergence calculation of a current travel locus is performed such that the evaluation value of an evaluation function is reduced using a travel locus (travel locus which satisfies the restriction conditions in the first convergence calculation) calculated last time, it is determined whether or not the evaluation value has become the minimum using the travel locus calculated this time, and the convergence calculation and the determination in each processing loop are repeated until a travel locus in which the evaluation value becomes the minimum is calculated. That is, when performing a convergence calculation, a vehicle speed in a corresponding mesh on the last travel locus is used as a vehicle speed of each mesh in the evaluation function and the average value of vehicle speeds of all meshes on the last travel locus is used as an average vehicle speed. When performing determination, a vehicle speed in a corresponding mesh on the travel locus calculated in the current convergence calculation is used as a vehicle speed of each mesh in the evaluation function and the average value of vehicle speeds of all meshes on the travel locus calculated in the current convergence calculation is used as an average vehicle speed. In the determination of whether or not the evaluation value has become the minimum, a differential value of the evaluation value is calculated and it is determined that the evaluation value has become the minimum when the differential value is 0 or becomes approximately 0.

In the case of an example shown in FIG. 2, the locus for passing the block B at the maximum speed is a travel locus C1, and C2 if the air resistance in the block B is taken into consideration. As a convergence calculation and determination using an evaluation function in each processing loop progress such that the evaluation value of the evaluation function shown in Expression (1) becomes the minimum, a travel locus which approaches the optimal locus C2 gradually is calculated.

The initialization condition generation processing will be described. As pre-processing for performing the travel locus optimization processing, an initial locus as an initial condition is generated. This initial locus is a locus in which regenerative deceleration is prioritized, and is a locus in which decelerating by regeneration in a hybrid vehicle is prioritized. That is, by decelerating only by regenerative deceleration as much as possible at the time of deceleration, energy loss caused by heat radiation when using a hydraulic brake can be reduced. As a result, gas mileage is improved. Thus, since a travel locus which approximates the optimal locus can be used from the beginning of optimization processing by performing the travel locus optimization processing using the initial locus in which gas mileage is taken into consideration, erroneous travel loci resulting from use of a local minimum value can be avoided. Accordingly, since the number of times of convergence calculation and determination until reaching the optimal travel locus can be reduced, the processing load can also be reduced.

In the case of decelerating only by regeneration, there is a margin corresponding to hydraulic brake deceleration at the time of deceleration, compared with a case where deceleration is performed with the total deceleration capability (deceleration using a regenerative brake+deceleration using a hydraulic brake) of the vehicle. For example, assuming that the total deceleration capability of the vehicle is 1.0 G and the regenerative deceleration capability is 0.2 G, a margin of 0.8 G occurs at the time of deceleration. Therefore, when considering friction circle limitation by the lateral force and the front and back force, the margin is distributed to the lateral force at the time of deceleration on a curved road. In this case, the ideal horizontal G distribution can be acquired under the conditions of deceleration G<acceleration G. As a result, the traveling curve can be made long by the lateral force corresponding to the margin at the time of deceleration, and it approaches a straight line at the time of acceleration since there is no margin. Therefore, in order to follow such a travel locus on a curved road, it is necessary to move the clipping point to the curve entrance side and to move the minimum speed point to the curve exit side. In addition, since this initial locus cannot be applied on the straight road, an arbitrary locus is given as an initial locus in the travel locus optimization processing.

First, the ECU 30 generates a travel locus of Out-In-Out which is general in curved road traveling. Then, the ECU 30 determines a deceleration upper limit (for example, 0.2 G; may be given in a system) by regeneration on the basis of system capability as a hybrid vehicle. In addition, the ECU 30 determines an acceleration upper limit (for example, 0.4 G; may be given in a system) at which heat efficiency of engine output at the time of acceleration is good.

The ECU 30 moves a clipping point in the middle of the curve on the travel locus of Out-In-Out to the entrance side of the curve according to the deceleration upper limit and the acceleration upper limit. For example, the movement rate of the clipping point is calculated by Expression (2).

[Expression 2]

$$\text{Clipping point ratio} = \text{deceleration upper limit}/(\text{acceleration upper limit} + \text{deceleration upper limit}) \quad (2)$$

The ECU 30 moves a minimum vehicle speed point (maximum curvature point) in the middle of the curve on the travel locus of Out-In-Out to the exit side of the curve according to the deceleration upper limit and the acceleration upper limit. For example, a portion equivalent to the movement rate of the clipping point is moved to the exit side (point which is symmetrical with the moved clipping point).

Then, the ECU 30 generates an initial locus by combining the moved clipping point, the moved minimum vehicle speed point, and the like by a smooth curve. Any kind of curve may be used as the smooth curve. For example, there is a clothoid curve.

In the case of an example shown in FIG. 3, a clipping point CP3 on a travel locus C3 of Out-In-Out is moved to a point CP4 at the curve entrance side and a minimum vehicle speed point VP3 is moved to a point VP4 at the curve exit side. Accordingly, an initial locus C4 is generated.

The continuous curve managing processing will be described. When curves continue on the mountain road or the like, each curve is divided into a plurality of blocks in the unit of a curved road or a straight road and optimization processing is performed in the unit of a block. Here, as shown in FIG. 4, a total marginal time is calculated by subtracting a total maximum-speed transit time from a target transit time in the entire continuous curve, the total marginal time is distributed in proportion to the amount of heat radiation caused by a hydraulic brake in each block B1, . . . , and a marginal time (time by which it is allowed to be later than in maximum-speed traveling) is assigned to each block B1, . . . . Then, a target transit time is calculated from the maximum-speed transit time and the marginal time for each block B1, . . . , and optimization processing is performed using the target transit time as restriction conditions. The reason for distribution using the amount of heat radiation caused by a hydraulic brake is that fuel consumption can be reduced by reducing heat radiation (useless energy) caused by the hydraulic brake.

Since there is a margin in the transit time in the case of a block with a large marginal time, a travel locus which prioritizes gas mileage can be generated. On the other hand, since there is no margin in the transit time in the case of a block with little marginal time, a travel locus which prioritizes traveling fast is generated. Thus, since optimization processing can be performed for each block by division into a block in which gas mileage is prioritized and a block in which a speed is prioritized, memory or the processing load can be reduced. In addition, when optimization processing is performed for the entire continuous curve, relatively easy processing is possible if only the maximum-speed traveling is considered. However, if gas mileage traveling is also taken into consideration, the restriction condition in which the total transit time of a plurality of blocks is a designated time (average speed) is common and a large memory and a complicated program are accordingly needed to solve it for a plurality of blocks. As a result, the processing load also increases.

In the case of a continuous curve, the ECU 30 divides the continuous curve into a plurality of blocks in units of a curved road or a straight road. In addition, the ECU 30 performs optimization processing for the entire continuous curve under the maximum-speed traveling condition. As a result, a travel locus at the maximum speed is generated and the total maximum-speed transit time is obtained. Here, the optimization processing is performed under the maximum-speed traveling condition using a known method.

The ECU 30 calculates a maximum-speed transit time for, each block on the basis of the total maximum-speed transit time. In addition, the EU 30 calculates the total marginal time by Expression (3) using the total maximum-speed transit time and the total target transit time. The total target transit time is a target time for passing the entire continuous curve. For example, a time input by the driver is used.

[Expression 3]

$$\text{Total marginal time} = \text{total target transit time} - \text{total maximum-speed transit time} \quad (3)$$

The ECU 30 determines whether or not the total marginal time is smaller than 0. When the total marginal time is smaller than 0, it is later than the total target transit time even if the vehicle travels at the maximum speed. Accordingly, a travel locus calculated by optimization processing under the maximum-speed traveling condition is used.

When the total marginal time is equal to or larger than 0, the vehicle can pass earlier than the total target transit time. In this case, the ECU 30 calculates the amount of brake heat radiation in each block. Any calculation method may be used as this calculation method. Moreover, for every block, the ECU 30 calculates a marginal time in a block by Expression (4) using the total marginal time, the amount of brake heat radiation in each block, and the amount of brake heat radiation in all blocks.

[Expression 4]

Marginal time of block=total marginal time×(amount of brake heat radiation of block/total amount of brake heat radiation) (4)

For every block, the ECU 30 calculates a target transit time in a block by Expression (5) using the maximum-speed transit time and the marginal time in a block.

[Expression 5]

Target transit time of block=maximum-speed transit time of block+marginal time of block (5)

Then, the ECU 30 generates a travel locus for each block by performing optimization processing in a state where the target transit time in a block is added to the restriction conditions. Here, the travel locus optimization processing described above is performed, but the optimization processing is performed by using restriction conditions in which the target transit time is also added and using an evaluation function in which the only condition is the variance of vehicle speed by removing a condition of the transit time.

The vehicle control function will be described. The ECU 30 generates a steering control signal, an engine control signal, a brake control signal, a motor control signal, or a regeneration control signal on the basis of a difference between the optimal travel locus and the actual vehicle state (yaw rate, lateral G, longitudinal G, vehicle speed, absolute position, relative relationship with respect to the center of a lane, and the like) while taking an obstacle (front vehicle and the like) around the vehicle into consideration, every fixed time, so that the vehicle travels along the calculated optimal travel locus and transmits the signals to the steering actuator 20, the throttle actuator 21, the brake actuator 22, and the motor 23, respectively.

Figure 5:
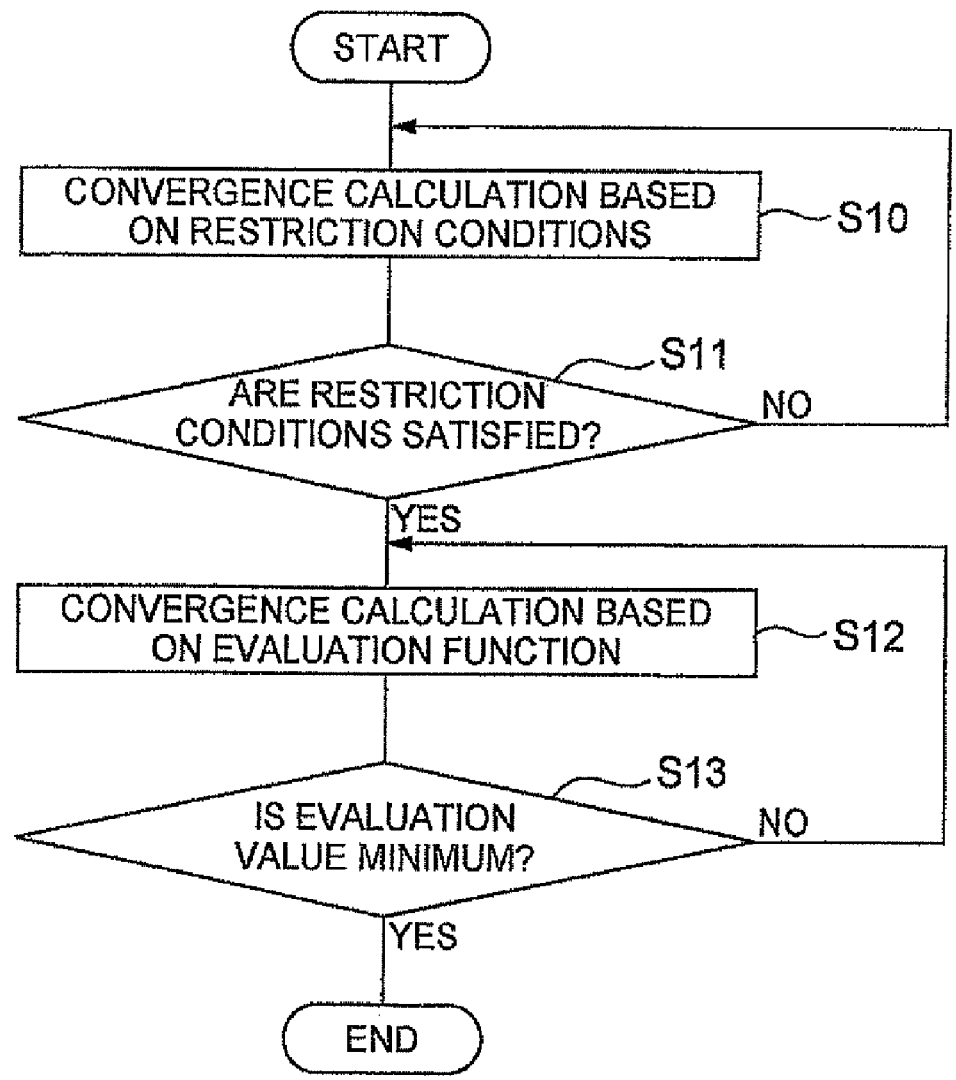
FIG. 5 is a flow chart showing the flow of travel locus optimization processing in an ECU according to the present embodiment.
Figure 6:
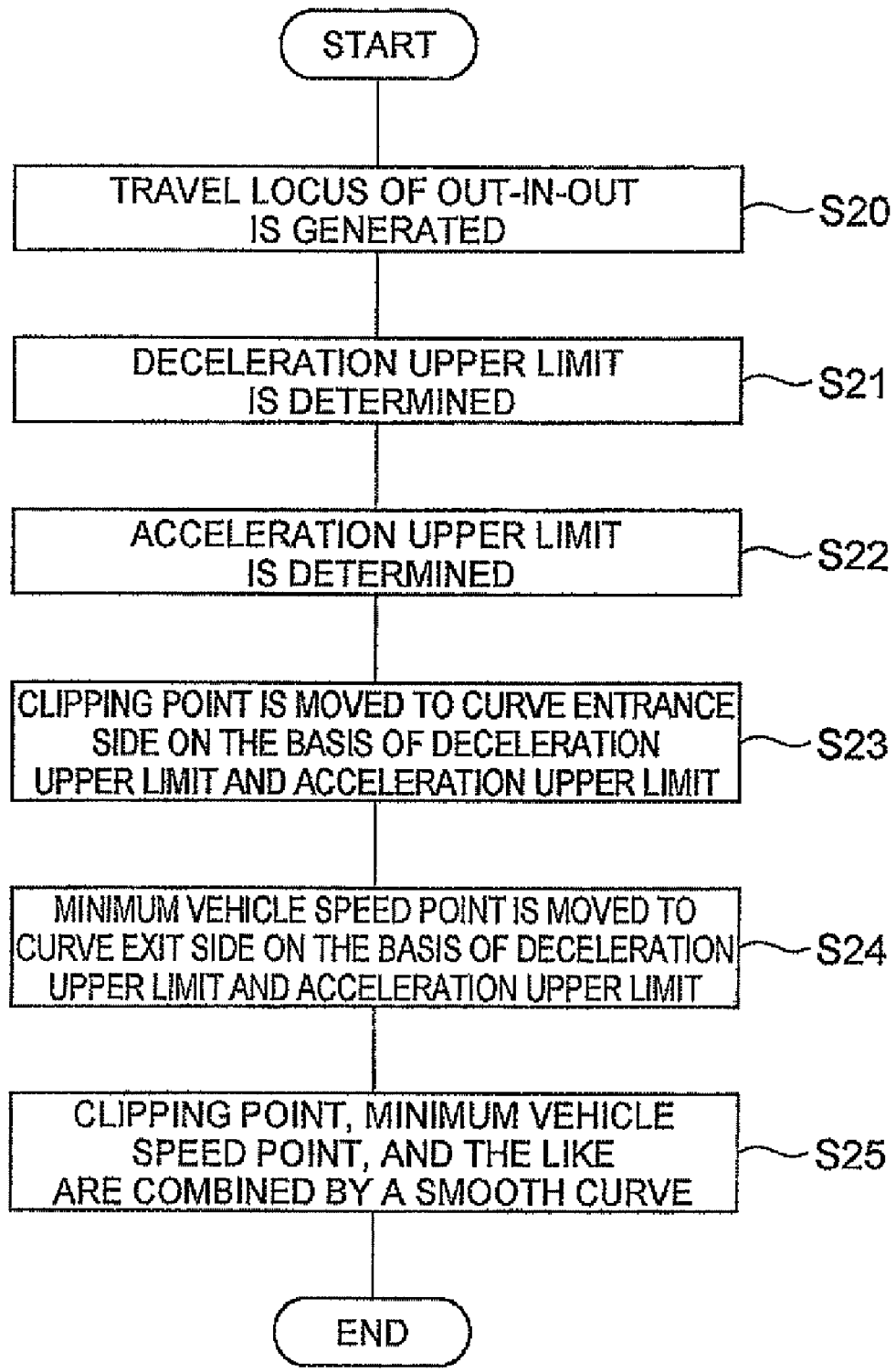
FIG. 6 is a flow chart showing the flow of initial condition generation processing in the ECU according to the present embodiment.
Figure 7:
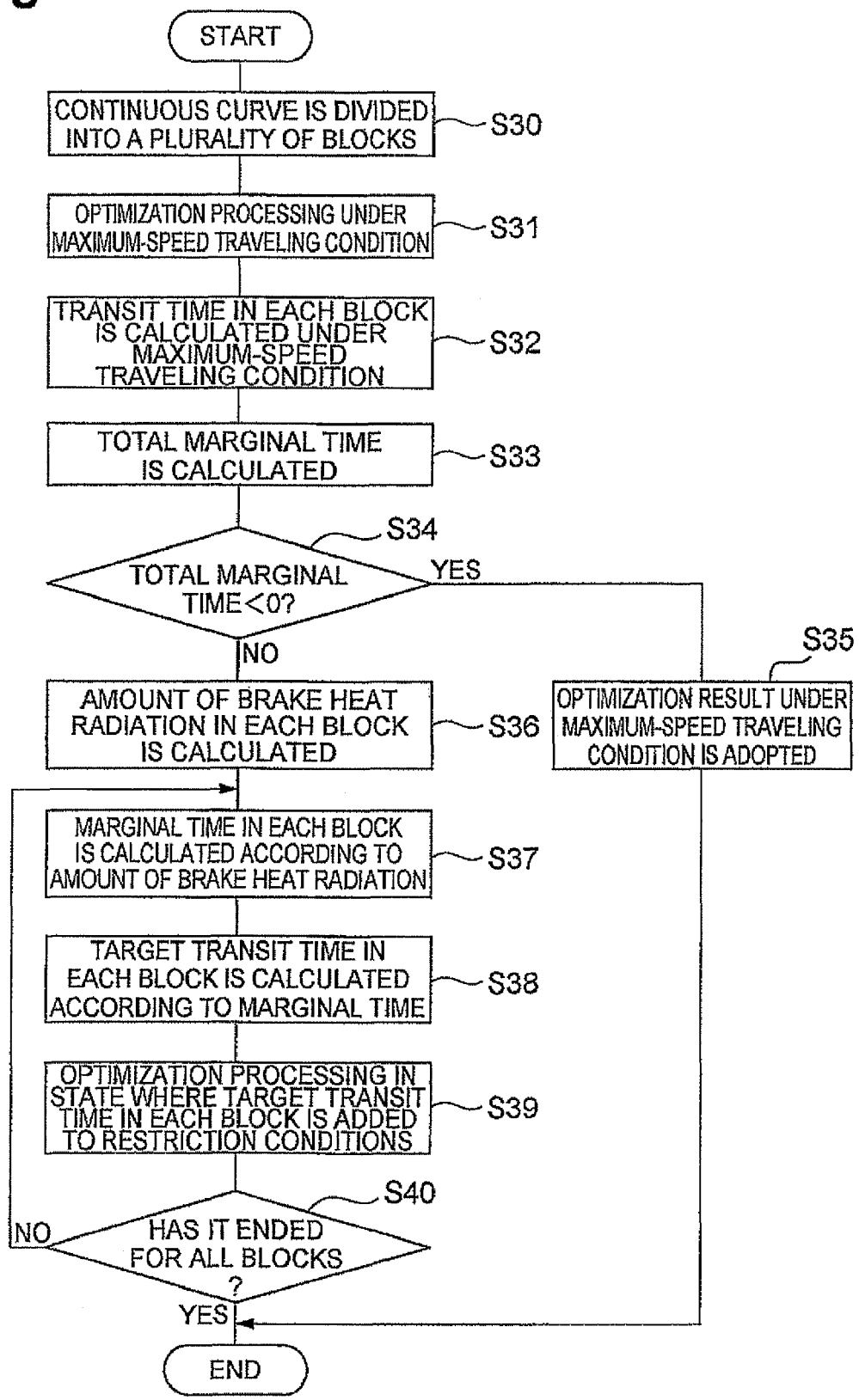
FIG. 7 is a flow chart showing the flow of continuous curve managing processing in the ECU according to the present embodiment.

Referring to FIGS. 1 to 4, an operation in the automatic driving controller 1 will be described. Here, operations of the travel locus optimization function, the initial condition generating function, and the continuous curve managing function in the automatic driving controller 1 will be described. Particularly, travel locus optimization processing, initial condition generation processing, and continuous curve managing processing in the ECU 30 will be described according to flow charts in FIGS. 5 to 7. FIG. 5 is a flow chart showing the flow of travel locus optimization processing in the ECU according to the present embodiment. FIG. 6 is a flow chart showing the flow of initial condition generation processing in the ECU according to the present embodiment. FIG. 7 is a flow chart showing the flow of continuous curve managing processing in the ECU according to the present embodiment.

The travel locus optimization function will be described. The navigation system 16 reads the shape information regarding the current driving road from the map database and transmits the road shape information to the ECU 30 as a navigation signal. The ECU 30 receives a navigation signal to acquire the road shape information.

The ECU 30 generates a travel locus by a convergence calculation based on the restriction conditions, which include conditions of a road boundary and a vehicle performance limitation, with an initial locus set by the initial condition generating function or the like as an initial condition (S10). The ECU 30 determines whether or not the travel locus generated this time satisfies the restriction conditions (S11). When it is determined that the travel locus generated this time does not satisfy the restriction conditions in S11, the ECU 30 generates a travel locus by the convergence calculation based on the restriction conditions using the travel locus generated last time (S10) and determines whether or not the travel locus generated this time satisfies the restriction conditions (S11).

When it is determined that the travel locus generated this time satisfies the restriction conditions in S11, the ECU 30 generates a travel locus by a convergence calculation based on an evaluation function, which is the sum of variance of a vehicle speed and a transit time in the block B, using the travel locus which satisfies the restriction conditions (S12). The ECU 30 determines whether or not the evaluation value of the travel locus generated this time is the minimum (S13). When it is determined that the evaluation value is not the minimum in S13, the ECU 30 generates a travel locus by a convergence calculation based on the evaluation function using the travel locus generated last time (S12) and determines whether or not the evaluation value of the travel locus generated this time is the minimum (S13).

When it is determined that the evaluation value is the minimum in S13, the ECU 30 sets the generated travel locus as an optimal locus. Then, the automatic driving controller 1 performs acceleration or deceleration control and steering control so that the vehicle travels along the optimal locus (vehicle control function is performed).

Moreover, in the present embodiment, the processing of S10 and S11 is equivalent to a restriction condition calculating step described in the appended claims, and the processing of S12 and S13 is equivalent to an evaluation function calculating step described in the appended claims.

The initial condition generation processing will be described. When a travel path for which an optimal locus is generated is a curved road, the ECU 30 generates a travel locus of Out-In-Out (S20). In addition, the ECU 30 determines a deceleration upper limit by regenerative deceleration in a hybrid vehicle (S21) and determines an acceleration upper limit at which engine output heat efficiency is good (S22).

Then, the ECU 30 moves a clipping point of Out-In-Out to the curve entrance side on the basis of the deceleration upper limit and the acceleration upper limit (S23). Then, the ECU 30 moves a minimum vehicle speed point of Out-In-Out to the curve exit side on the basis of the deceleration upper limit and the acceleration upper limit (S24). Then, the ECU 30 generates an initial locus by combining the moved clipping point, the moved minimum vehicle speed point, and the like by a smooth curve and uses the initial locus as the initial condition in the travel locus optimization function.

In addition, in the present embodiment, the processing of S20 to S25 is equivalent to an initial condition generating step described in the appended claims.

The continuous curve managing function will be described. When a travel path for which an optimal locus is generated is a continuous curve, the ECU 30 divides the continuous curve into a plurality of blocks (S30). Then, the ECU 30 calculates a maximum-speed transit time in the entire continuous curve by performing optimization processing for the entire continuous curve under the maximum-speed traveling condition (S31). Then, the ECU 30 distributes, the total maximum-speed transit time to each block and calculates a maximum-speed transit time for every block (S32).

The ECU 30 calculates a total marginal time in the entire continuous curve by subtracting the total maximum-speed transit time from the total target transit time (S33). Then, the ECU 30 determines whether or not the total marginal time is smaller than 0 (S34). When it is determined that the total marginal time is smaller than 0 in S34, the ECU 30 sets the travel locus, which was generated by the optimization processing under the maximum-speed traveling condition, as an optimal locus (S35). Then, the automatic driving controller 1 performs acceleration or deceleration control and steering control so that the vehicle travels along the optimal locus.

When it is determined that the total marginal time is equal to or larger than 0 in S34, the ECU 30 calculates the amount of brake heat radiation in each block (S36). Then, the ECU 30 calculates a marginal time for each block according to the amount of brake heat radiation of the block (S37). Then, the ECU 30 calculates a target transit time for every block on the basis of the marginal time and the maximum-speed transit time of the block (S38). Then, the ECU 30 generates an optimal locus for every block by performing optimization processing (performing the above-described travel locus optimization fimetion) in a state where the target transit time in a block is added to the restriction conditions (S39).

The ECU 30 determines whether or not the optimization processing has ended for the entire continuous curve (S40). When it is determined that the optimization processing has not ended for the entire continuous curve in S40, the ECU 30 returns to S37 to perform the processing for the next block. On the other hand, when it is determined that the optimization processing has ended for the entire continuous curve in S40, the automatic driving controller 1 performs acceleration or deceleration control and steering control so that the vehicle travels along the generated optimal travel locus.

Moreover, in the present embodiment, the processing of S30 is equivalent to a block dividing step described in the appended claims, the processing of S31 is equivalent to a maximum-speed traveling optimizing step described in the appended claims, the processing of S32 is equivalent to a transit time calculating step described in the appended claims, the processing of S36 and S37 is equivalent to a marginal time calculating step described in the appended claims, and the processing of S38 is equivalent to a target transit time calculating step described in the appended claims.

According to the automatic driving controller 1, it is possible to generate the optimal locus, in which a practical transit time and reduction of fuel consumption are compatible, by performing the optimization processing using the evaluation function obtained by adding the sum of variance of the vehicle speed to the transit time in the block B. By this optimal locus, the vehicle can travel at a practical vehicle speed while suppressing the air resistance over the entire travel path. Particularly in the curved road where a lateral force occurs and acceleration and deceleration are needed, a suitable travel locus can be generated.

In addition, according to the automatic driving controller 1, a travel locus which approximates the optimal locus can be used from the beginning of optimization processing by generating an initial locus in consideration of the fuel consumption characteristic which prioritizes the regenerative deceleration. Accordingly, since erroneous travel loci resulting from use of a local minimum value can be avoided, the processing load can also be reduced.

Moreover, according to the automatic driving controller 1, the optimization processing can be individually performed for every block with the target transit time as a restriction condition by distributing a marginal time corresponding to the amount of brake heat radiation of each block in the continuous curve. Accordingly, memory or the processing load can be reduced.

Having described the embodiment of the present invention, the present invention is not limited to those embodiments and is executed in various forms.

For example, although the present invention was applied to a hybrid vehicle of automatic driving in the present embodiment, it may be applied to a vehicle which offers various kinds of driving support using the optimal locus for manual driving and may also be applied to a vehicle with a single driving source, such as an internal combustion engine or a motor. In particular, the travel locus optimizing function or the continuous curve managing function may also be applied to a vehicle which uses only an internal combustion engine as a driving source, and the initial condition generating function can be applied only to a hybrid vehicle.

Moreover, in the present embodiment, the present invention was applied to the automatic driving controller which generated the optimal locus and performed automatic driving according to the optimal locus. However; the present invention may also be applied to a device which generates an optimal locus and provides the optimal locus to the driver by display or the like or may be applied to a device which generates an optimal locus and offers various kinds of driving support using the optimal locus.

In addition, although one ECU was used in the present embodiment, a plurality of ECUs may be used.

Moreover, although the evaluation function was set to include the transit time and the variance of vehicle speed in the present embodiment, an optimal locus which prioritizes only gas mileage can be generated using a function of only the variance of vehicle speed as the evaluation function.

In addition, although the locus in which regenerative deceleration is prioritized is calculated by moving the clipping point and the minimum vehicle speed point on the basis of the deceleration upper limit and the acceleration upper limit in the present embodiment, the locus in which regenerative deceleration is prioritized may be calculated by using other methods.

In addition, although the marginal time is distributed according to the amount of brake heat radiation in the present embodiment, the marginal time may also be distributed by other parameters in which the fuel consumption characteristic is taken into consideration.

INDUSTRIAL APPLICABILITY

In the present invention, it is possible to generate a travel locus in consideration of a fuel consumption, characteristic by performing optimization using an evaluation function including the variance of speed. This can contribute to an improvement in gas mileage.

The invention claimed is:
1. A travel locus generating method of generating a future travel locus of a vehicle, comprising:
   a restriction condition calculating step of performing a convergence calculation of restriction conditions including at least a condition of a road boundary; and
   an evaluation function calculating step of deriving a travel locus by a convergence calculation using an evaluation function, which includes at least evaluation of a variance of speed, in a state where the restriction conditions in the restriction condition calculating step are satisfied.
2. The travel locus generating method according to claim 1, further comprising:
   an initial condition generating step of generating a travel locus, in which decelerating by regenerative deceleration at the time of deceleration of a vehicle is prioritized, as an initial condition when a driving system of the vehicle is a hybrid system.
3. The travel locus generating method according to claim 2, wherein in the initial condition generating step, a travel locus is generated in which a clipping point is moved to a curve entrance side and a minimum speed point is moved to a curve exit side corresponding to a deceleration upper limit and an acceleration upper limit determined by system capability of the hybrid system.

4. The travel locus generating method according to claim 1, further comprising:
- a block dividing step of dividing a continuous curve into a plurality of blocks;
- a maximum-speed traveling optimizing step of performing optimization processing under a maximum-speed traveling condition;
- a transit time calculating step of calculating a transit time of each block divided in the block dividing step on the basis of an optimization result in the maximum-speed traveling optimizing step;
- a marginal time calculating step of calculating a marginal time of each block on the basis of the amount of brake heat radiation in each block divided in the block dividing step; and
- a target transit time calculating step of calculating a target transit time of each block on the basis of the transit time of each block calculated in the transit time calculating step and the marginal time of each block calculated in the marginal time calculating step.

5. A travel locus generating device that generates a future travel locus of a vehicle, comprising:
- a restriction condition calculating means for performing a convergence calculation of restriction conditions including at least a condition of a road boundary; and
- an evaluation function calculating means for deriving a travel locus by a convergence calculation using an evaluation function, which includes at least evaluation of a variance of speed, in a state where the restriction conditions of the restriction condition calculating means are satisfied.

6. The travel locus generating device according to claim 5, further comprising:
- an initial condition generating means for generating a travel locus, in which decelerating by regenerative deceleration at the time of deceleration of a vehicle is prioritized, as an initial condition when a driving system of the vehicle is a hybrid system.

7. The travel locus generating device according to claim 6, wherein the initial condition generating means generates a travel locus in which a clipping point is moved to a curve entrance side and a minimum speed point is moved to a curve exit side corresponding to a deceleration upper limit and an acceleration upper limit determined by system capability of the hybrid system.

8. The travel locus generating device according to claim 5, further comprising:
- a block dividing means for dividing a continuous curve into a plurality of blocks;
- a maximum-speed traveling optimizing means for performing optimization processing under a maximum-speed traveling condition;
- a transit time calculating means for calculating a transit time of each block divided by the block dividing means on the basis of an optimization result of the maximum-speed traveling optimizing means;
- a marginal time calculating means for calculating a marginal time of each block on the basis of the amount of brake heat radiation in each block divided by the block dividing means; and
- a target transit time calculating means for calculating a target transit time of each block on the basis of the transit time of each block calculated by the transit time calculating means and the marginal time of each block calculated by the marginal time calculating means.

* * * * *